US011279397B2

(12) United States Patent
Buys et al.

(10) Patent No.: US 11,279,397 B2
(45) Date of Patent: Mar. 22, 2022

(54) STEERING COLUMN

(71) Applicant: ROBERT BOSCH AUTOMOTIVE STEERING VENDOME S.A.S., Vendôme (FR)

(72) Inventors: Laurent Buys, Mont-Pres-Chambord (FR); Jean Gautier, Budapest (HU)

(73) Assignee: ROBERT BOSCH AUTOMOTIVE STEERING VENDOME S.A.S., Vendôme (FR)

( * ) Notice: Subject to any disclaimer, the term of this patent is extended or adjusted under 35 U.S.C. 154(b) by 0 days.

(21) Appl. No.: 16/958,968

(22) PCT Filed: Dec. 19, 2018

(86) PCT No.: PCT/EP2018/085879
§ 371 (c)(1),
(2) Date: Jun. 29, 2020

(87) PCT Pub. No.: WO2019/129579
PCT Pub. Date: Jul. 4, 2019

(65) Prior Publication Data
US 2020/0339180 A1    Oct. 29, 2020

(30) Foreign Application Priority Data
Dec. 27, 2017 (FR) .................................. 1763262

(51) Int. Cl.
*B62D 1/19*   (2006.01)
*B62D 1/184*  (2006.01)
*B62D 1/187*  (2006.01)

(52) U.S. Cl.
CPC ............. *B62D 1/195* (2013.01); *B62D 1/184* (2013.01); *B62D 1/187* (2013.01)

(58) Field of Classification Search
CPC ........ B62D 1/195; B62D 1/184; B62D 1/187; B62D 1/189
See application file for complete search history.

(56) References Cited

U.S. PATENT DOCUMENTS 10,000,229 B2 *  6/2018  Matsuno ................. B62D 1/189
10,442,457 B2 * 10/2019  Gstohl ................... B62D 1/185
(Continued)

FOREIGN PATENT DOCUMENTS

WO      2016/09164      6/2016

OTHER PUBLICATIONS

PCT/EP2018/085879, Feb. 13, 2019, International Search Report and Written Opinion.

*Primary Examiner* — Drew J Brown
(74) *Attorney, Agent, or Firm* — Ray Quinney & Nebeker P.C.; Paul N. Taylor

(57) ABSTRACT

The invention relates to a steering column with adjustment of the longitudinal extension and the incline of the steering wheel, comprising a sleeve carried by a deformable bearing provided with a clamping mechanism consisting of a clamping axle. The deformable bearing has two side limbs that are connected by a cross-member formed by two inclined faces joined by a bottom. The two side limbs each form a first side support close to the end of the limb and the two inclined faces each form an inclined second side support located opposite the first side supports, the bottom forming an intermediate support between the two inclined side supports. The clamping axle passes through the end of the two side limbs, beyond the first two side supports.

15 Claims, 11 Drawing Sheets

(56) References Cited

U.S. PATENT DOCUMENTS

| | | | | |
|---|---|---|---|---|
| 10,449,991 B2* | 10/2019 | Charvet | ............... | B62D 1/192 |
| 2006/0214410 A1* | 9/2006 | Sawada | ............... | B62D 1/184 |
| | | | | 280/775 |
| 2008/0290641 A1* | 11/2008 | Galehr | ............... | B62D 1/184 |
| | | | | 280/775 |
| 2010/0018340 A1 | 1/2010 | Schnitzer | | |
| 2013/0006471 A1* | 1/2013 | Kirmsze | ............... | F16K 27/02 |
| | | | | 701/36 |
| 2013/0160594 A1 | 6/2013 | Tinnin | | |
| 2018/0257693 A1* | 9/2018 | Schnitzer | ............ | B62D 1/184 |

* cited by examiner

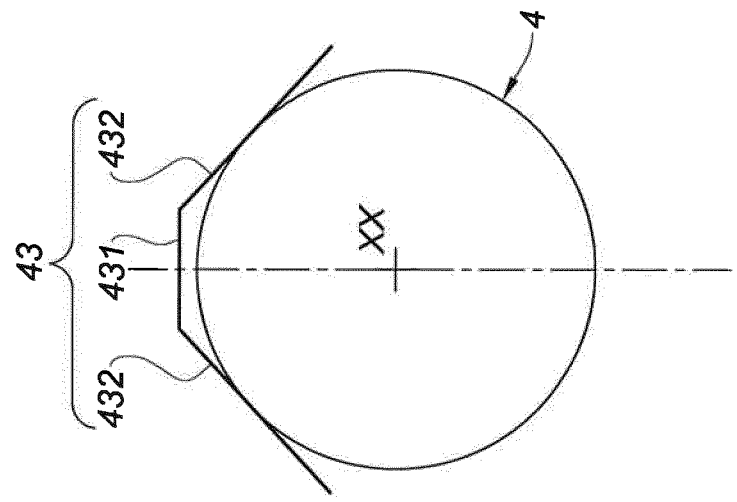
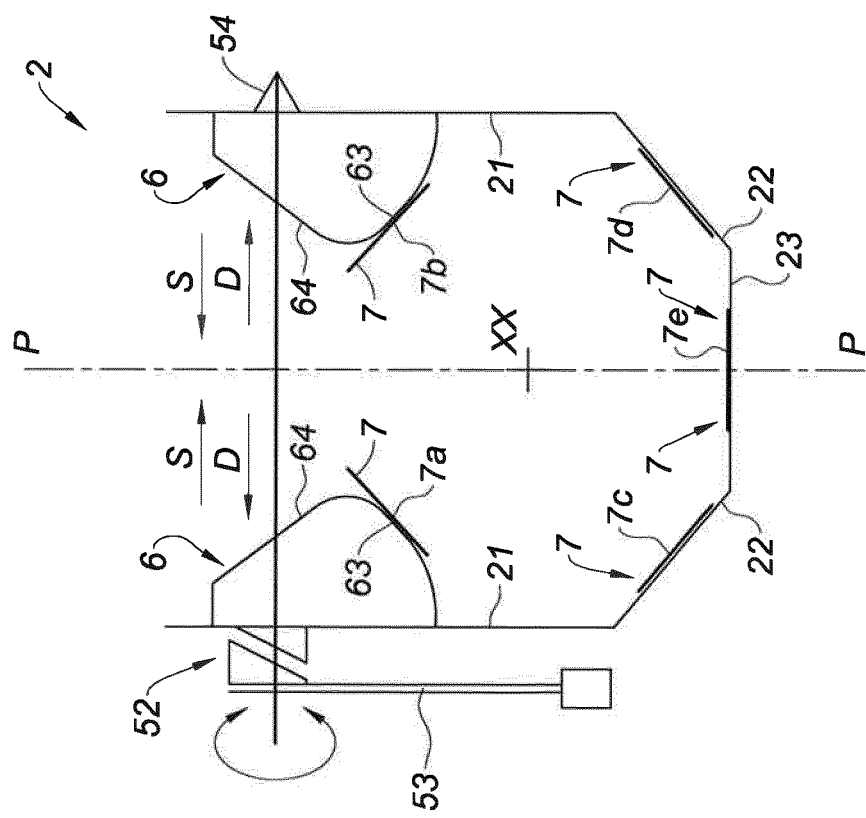
Fig. 4B
Fig. 4A

STEERING COLUMN

FIELD OF THE INVENTION

The present invention relates to a steering column with adjustment of the longitudinal extension and inclination of the steering wheel comprising:
  a support integral with the bodywork,
  a body mounted tilting around an axis of the support for the angular adjustment of the steering column,
  a sleeve borne by the body and adjustable in longitudinal extension with respect to the body and receiving the tube bearing the steering wheel,
  the sleeve and the body being connected by a deformable bearing provided with a clamping mechanism composed of a clamping axle associated with the deformable bearing and a clamping mechanism actuated by a lever,
  the support overlapping the deformable bearing at the level of the clamping mechanism to block or unblock the adjustments of the steering column by manoeuvring the lever.

PRIOR ART

According to the prior art, steering columns of the type defined above are known.

It is also known to produce so-called "tube in tube" steering columns, that is to say having a sliding tube in a fixed tube and which is blocked in this tube to block the adjustments of the steering column.

A steering column also exists formed of a press-formed body receiving a steel tube with interposition of a plastic sleeve. The clamping then takes place in the manner of a collar to block the adjustment of the tube with respect to the press-formed body.

AIM OF THE INVENTION

The aim of the present invention is to develop a steering column of which the force necessary for the adjustment is low while enabling a precise adjustment and which, nevertheless, once blocked, ensures a high retaining force.

DESCRIPTION AND ADVANTAGES OF THE INVENTION

The present invention relates to a steering column of the type defined above characterised in that the deformable bearing is U shaped with two lateral limbs connected by a cross-member formed of two inclined facets joined by a bottom, constituting a symmetrical shell and of which:
  the two lateral limbs each form a first lateral bearing surface close to the end of the limb,
  the two inclined facets each form a second inclined lateral bearing surface opposite the first lateral bearing surfaces, and
  the bottom forms an intermediate bearing surface between the two inclined lateral bearing surfaces,
  the clamping axle passing through the end of the two lateral limbs beyond the two first lateral bearing surfaces,
    in unclamped position of the deformable bearing for the adjustment,
      the sleeve is held and guided while sliding in the direction of extension by the cooperation of the intermediate bearing surface and the two first lateral bearing surfaces, in clamped position of the deformable bearing for the blocking,
      the two first lateral bearing surfaces and the two inclined bearing surfaces by moving away the intermediate bearing surface by the clamping deformation of the deformable bearing.

This steering column has the advantage of ensuring a better compromise between the state of adjustment of the column and that of the state of blocking. The steering column according to the invention makes it possible to reduce the forces necessary for the adjustment and conversely to increase the blocking of the adjustment.

The steering column according to the invention is of a particularly simple realisation.

According to another advantageous characteristic, the body comprises:
  a casing made of bent sheet with U shaped polygonal section, covered by a top stiffening it and connected by a pivot to the support,
  the deformable bearing for receiving the sleeve, extending the body by:
    two lateral limbs continuing by two inclined facets connected by a bottom forming a symmetrical shell around the sleeve,
    the two lateral limbs each forming a first lateral bearing surface,
    the two inclined facets each forming a second inclined lateral bearing surface, and
    the bottom forming an intermediate bearing surface,
    the bearing surfaces coming respectively on each side above and below the sleeve as well as under the bottom of the sleeve,
  in unclamped position of the bearing, for the sliding of the sleeve:
    the sleeve is held and guided along the axis XX by the cooperation of the intermediate bearing surface and the two first lateral bearing surfaces against the sleeve,
  in clamped position of the bearing for the blocking of the sleeve:
    the two first lateral bearing surfaces and the two second bearing surfaces are applied against the sleeve by moving away the intermediate bearing surface from the sleeve by deformation of the bearing.

According to an advantageous alternative, the body comprises:
  a tubular casing mounted in a base plate connected by a pivot to the support,
  a deformable bearing to receive the tubular casing, extending the sleeve by:
    two lateral limbs being continued by two inclined facets connected by a bottom forming a symmetrical shell around the tubular casing,
    the two lateral limbs each forming a first lateral bearing surface,
    the two inclined facets each forming a second inclined lateral bearing surface, and
    the bottom forming an intermediate bearing surface,
    the bearing surfaces coming respectively on each side above and on each side below the sleeve as well as on the top of the sleeve, and
  in unclamped position of the bearing, for the sliding of the sleeve:
    the tubular casing is held and guided along the axis XX by the cooperation of the intermediate bearing surface and the two first lateral bearing surfaces against the tubular casing, in clamped position of the bearing for the blocking of the sleeve:

the two first lateral bearing surfaces and the two second inclined lateral bearing surfaces are applied against the tubular casing by moving away the intermediate bearing surface from the tubular casing by deformation of the deformable bearing.

According to another advantageous characteristic, the lateral limbs are each provided with a console with lying V section of which the ends of the legs are welded to the respective limb and of which the inclined lower leg forms a bearing surface facing the bearing surface of the inclined facet, opposite.

These lateral limbs thus stiffened by the consoles make it possible to better transmit the compressive forces by the clamping to the other parts of the bearing and distribute in a highly symmetrical manner the forces between the upper bearing surfaces and the lower bearing surfaces.

According to another characteristic, the top of the sleeve, at least in the part of its length cooperating with the deformable bearing, is provided with a folded plate with two flaps connected by a median band, the two flaps being in a position homologous to that of the upper lateral bearing surfaces for receiving the bearing surfaces in clamped position and in unclamped position of the deformable bearing.

This embodiment combines both the rotational blocking of the sleeve and the distribution of the clamping forces.

According to another characteristic, the upper and lower lateral bearing surfaces as well as the intermediate bearing surface are formed by plates fastened respectively to the consoles of each wall, to the inclined facets and to the bottom.

According to another characteristic, the clamping axle passes through the limbs in the zone overlapped by the console of each limb and externally resting on the limbs to clamp/unclamp them and to block/unblock the deformable bearing.

To summarise, the steering column according to the invention not only has the advantages of use but is also of simple and efficient realisation.

DRAWINGS

The present invention will be described hereafter in a more detailed manner by means of an embodiment of a steering column with longitudinal adjustment represented in the appended drawings in which.

Figure 1:
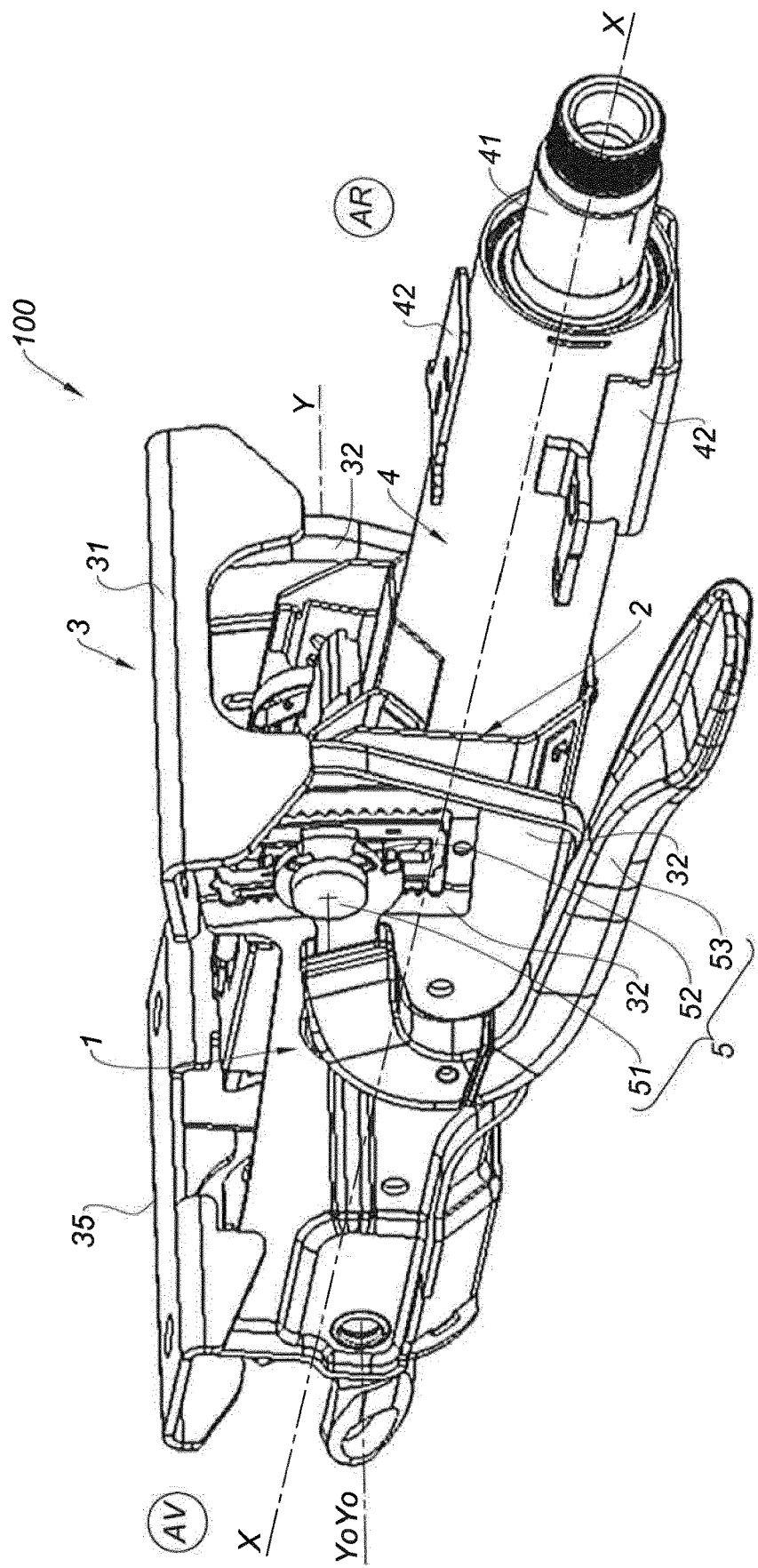
FIG. 1 is an isometric view of a steering column according to the invention.
Figure 2:
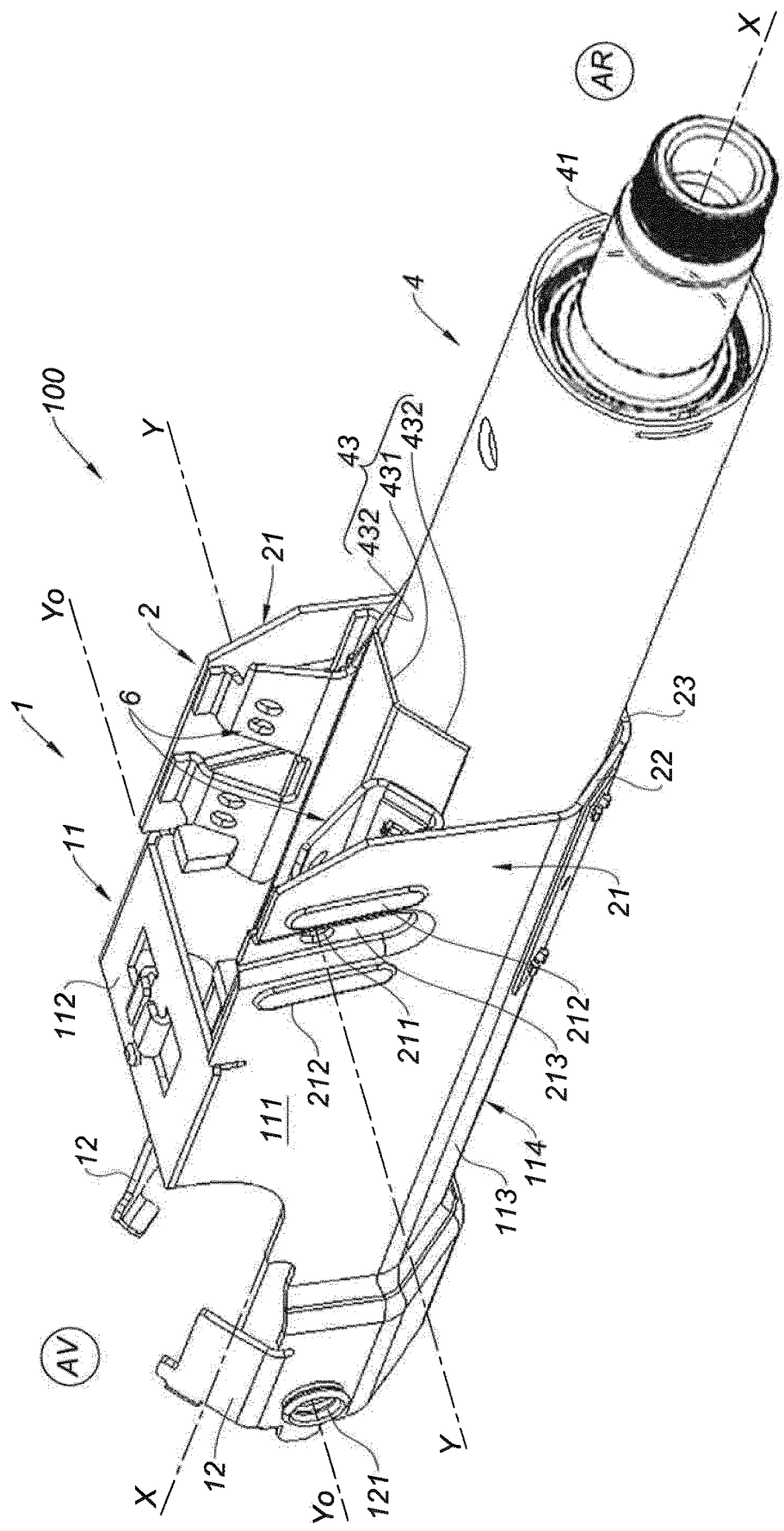
Figure 3:
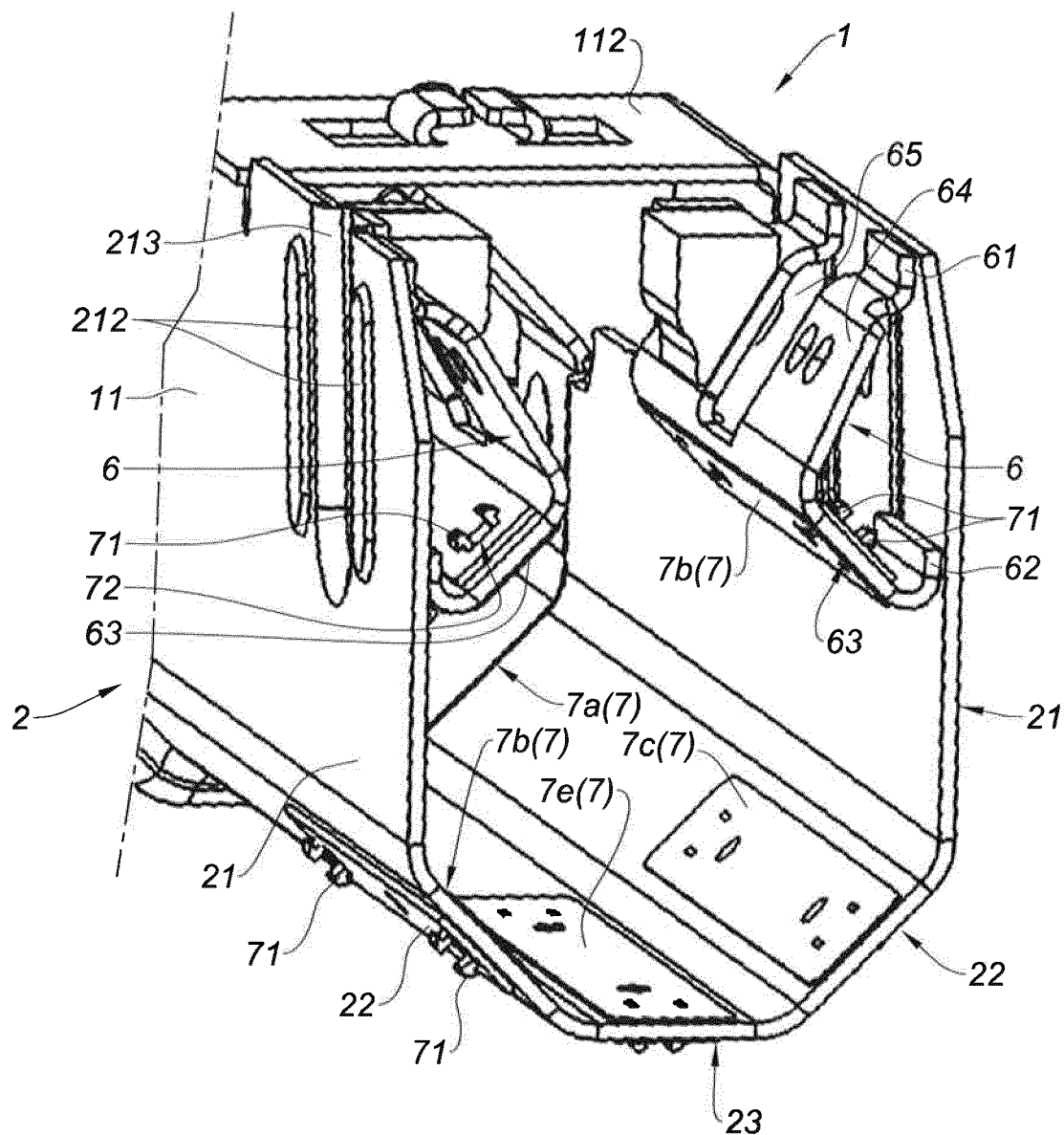
Figure 6:
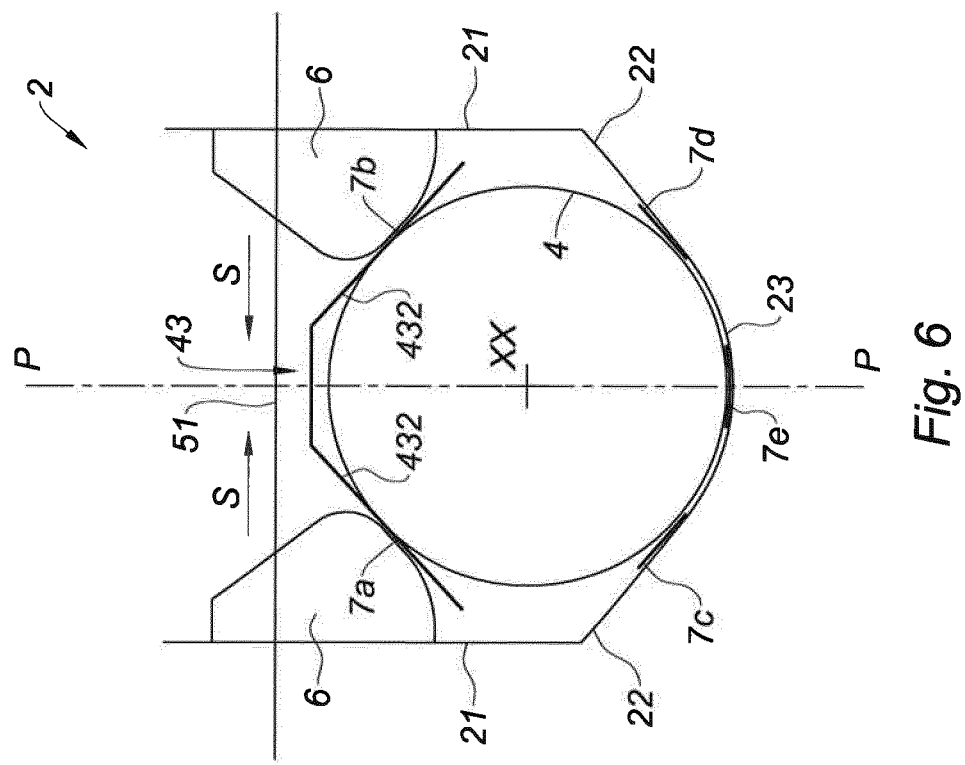
Figure 5:
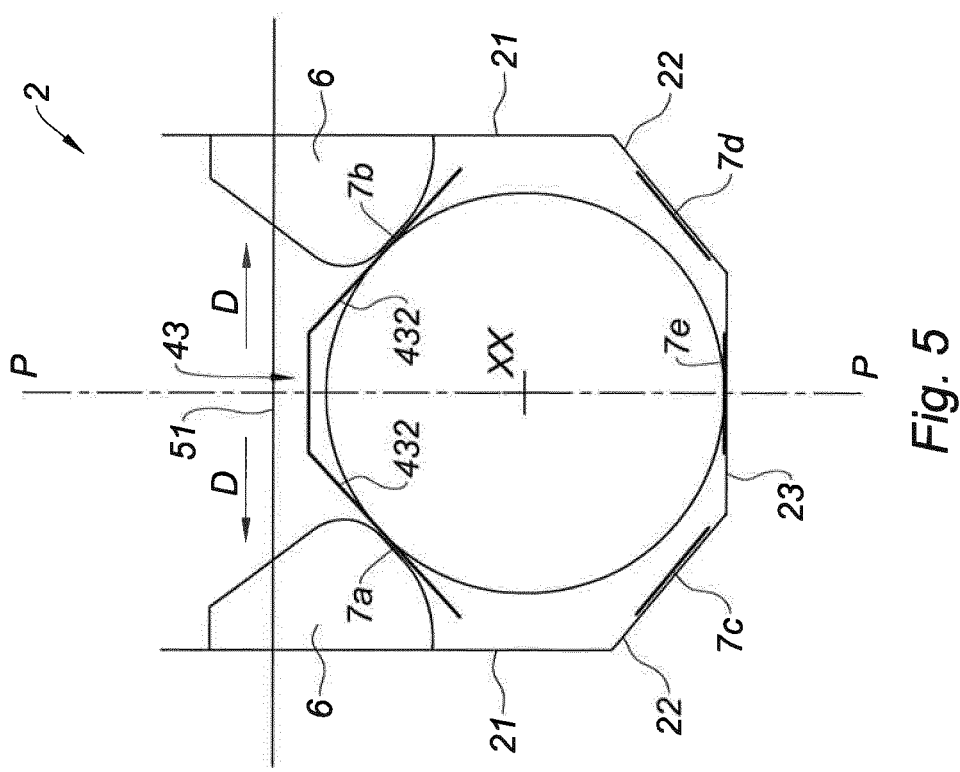
Figure 7:
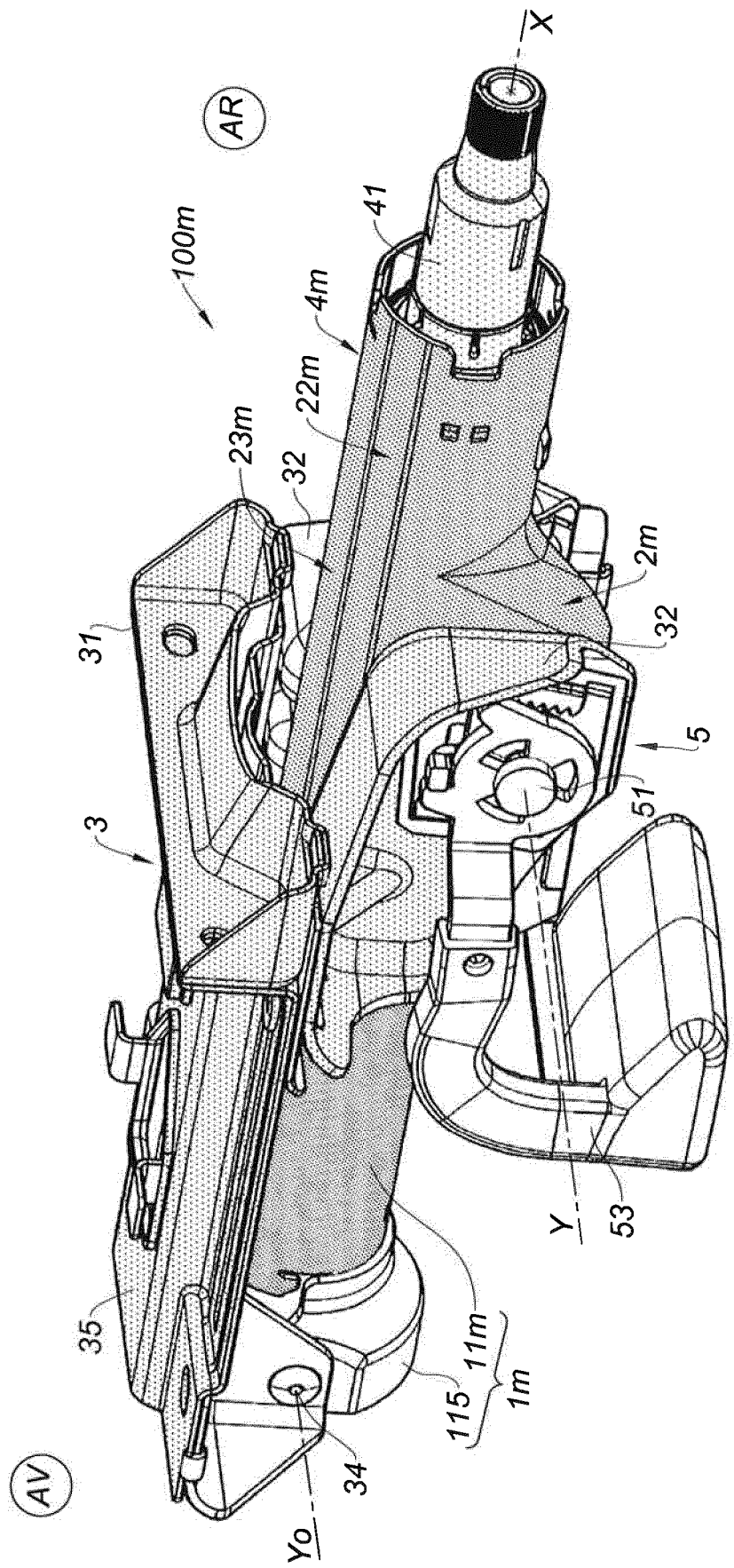
Figure 7A:
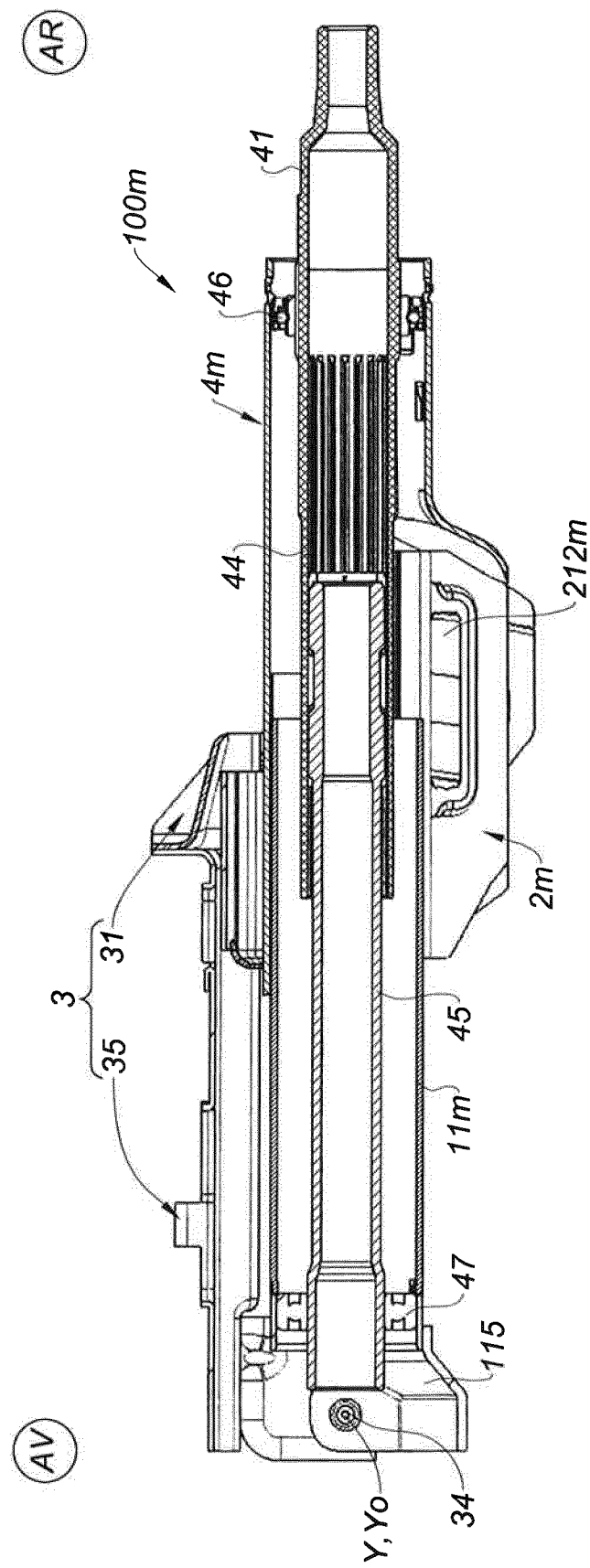
Figure 7B:
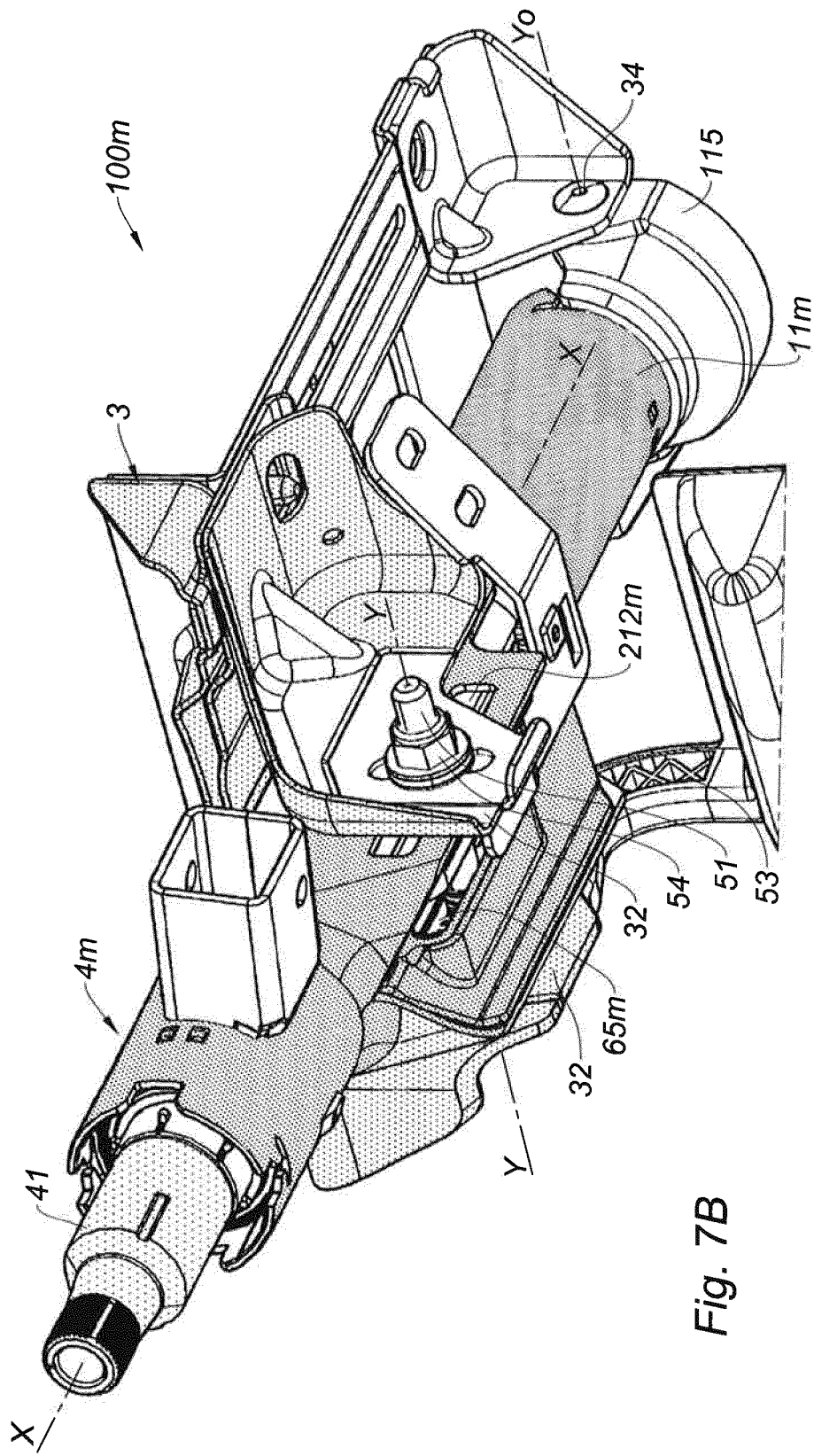
Figure 8:
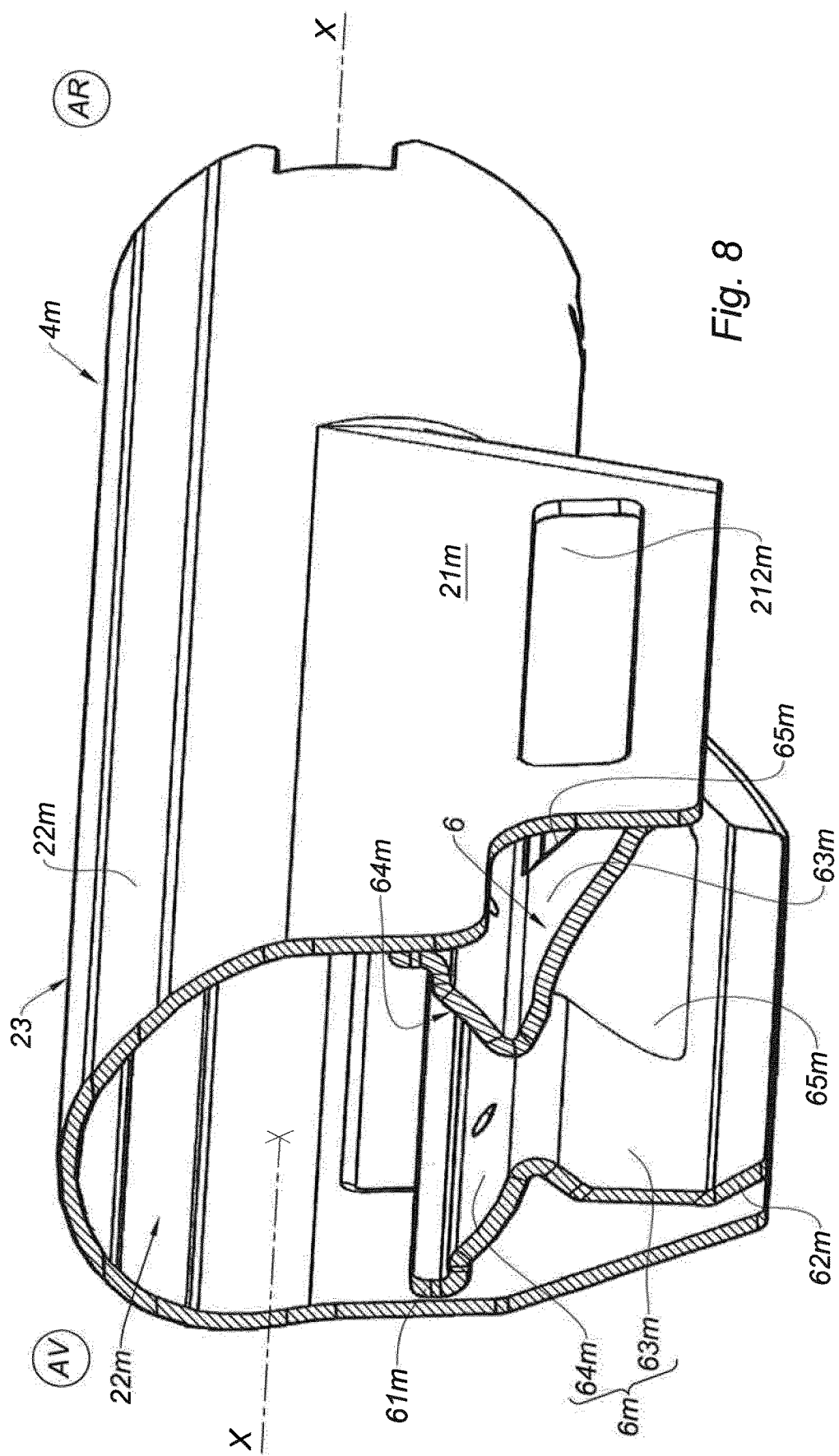
Figure 9:
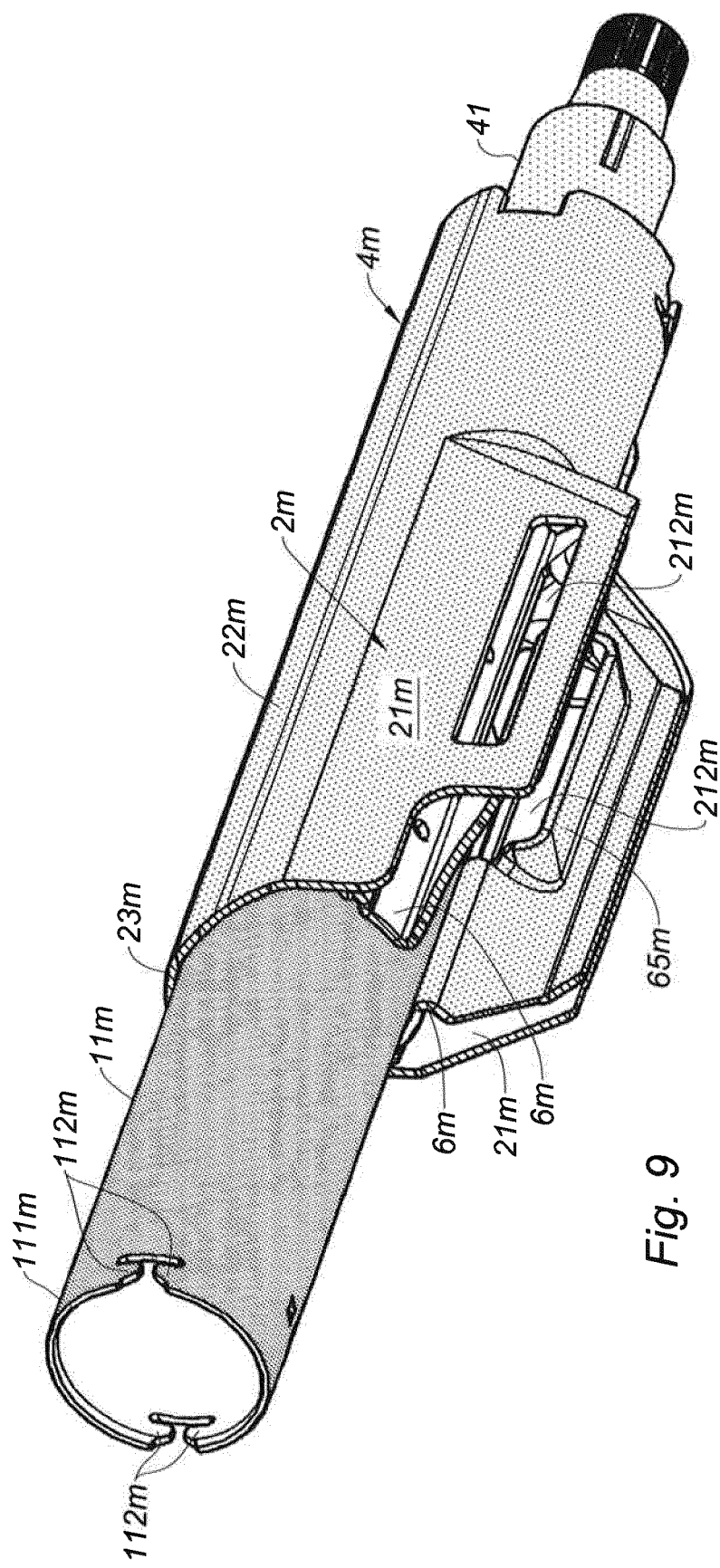

FIG. 2 is an isometric view according to FIG. 1 limited to the casing and to the telescopic sleeve, FIG. 3 is an isometric view of a part of the casing of the body of the column and the deformable bearing receiving the telescopic sleeve, FIG. 4A is a diagram of the section of the deformable bearing, FIG. 4B is a diagram of the section of the sleeve, FIG. 5 is a very schematic section of the deformable bearing in unclamped position and of the sleeve housed therein, FIG. 6 is a very schematic section of the deformable bearing in clamped position on the sleeve, FIG. 7 is an isometric view of an alternative of steering column according to the invention, FIG. 7A is an axial sectional view of the steering column of FIG. 7, FIG. 7B is another isometric view of the steering column of FIG. 7, FIG. 8 is an isometric view of the deformable bearing, and FIG. 9 is an isometric view of the deformable bearing fitted on the tubular casing.

DESCRIPTION OF AN EMBODIMENT OF THE INVENTION

Figure 1A:
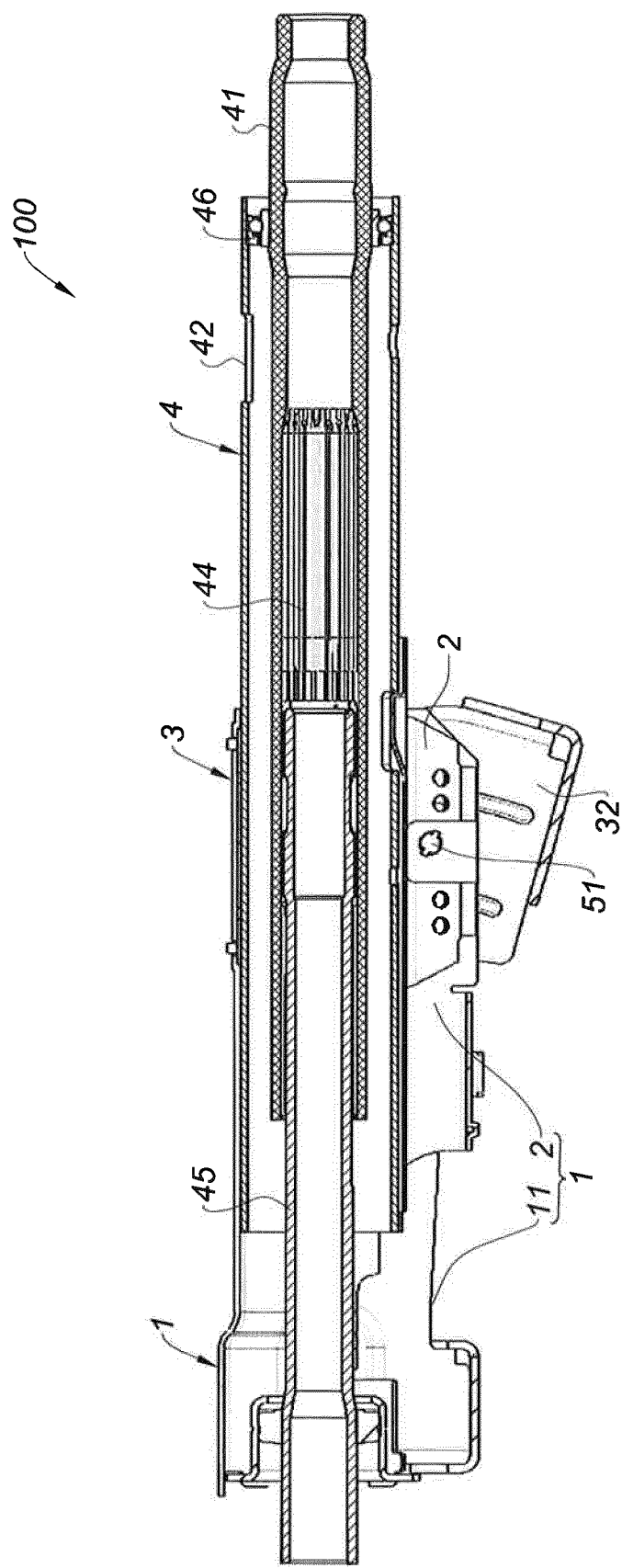
FIG. 1A is an axial section of the steering column of FIG. 1.

According to the overall view of FIG. 1 and the axial sectional view of FIG. 1A, the invention relates to a steering column 100 schematically represented without its steering wheel. The column 100 is composed of a body 1 in the form of a casing 11 continuing, on the steering wheel side (side AR), by a deformable bearing 2 connected to a support 3 in the form of a rider, fastened to the bodywork and receiving the cylindrical sleeve 4 (or telescopic sleeve) provided with a tube 41 bearing the steering wheel, not represented.

As a remark, the functions AV and AR correspond to the orientation of the steering column installed in the vehicle; the notions of upper and lower used in the description relate to the orientation of the steering column 100 in its representation of the figures. But this orientation may be inversed if the column is used in inversed position. This does not modify the invention such as described.

The body 1 receives the sleeve 4 in a longitudinally adjustable but rotationally blocked manner. The sleeve 4 is provided with supports 42 for control elements for speed adjustment, the audio system, the telephone and certain functions of the dashboard. The sleeve 4 houses the tube 41 bearing the steering wheel translationally integral but rotationally free. The body 1 is itself mounted tilting around an axis YoYo, in a "vertical" plane with respect to the bodywork for the angular adjustment of the steering wheel in addition to its longitudinal adjustment along the axis XX. The longitudinal adjustment of the steering wheel is synonymous with longitudinal adjustment of the sleeve 4 since the sleeve 4 and the tube 41 bearing the steering wheel are translationally integral; the sleeve 4 is rotationally blocked with respect to the body 1 and the tube 41 and is rotationally free around the axis XX.

Although the mechanism of angular adjustment is not directly concerned by the present invention, it should be remarked that its support 3 in the form of rider fixed to the bodywork is composed of a cross-member 31 with two lugs 32 coming on either side of the body 1; these lugs 32 are connected to the deformable bearing 2 and they cooperate with the clamping mechanism 5. At its other end, the support 3 has a front cross-member 35 bearing the pivot of axis YoYo.

According to FIG. 1A, the tube 41 is connected by a splined connection 44 rotationally integral with a transmission tube 45 which transmits the rotational movement of the steering wheel to the steering mechanism, not represented.

The tube 41 is held in the sleeve 4 by an anti-friction bearing 46.

The sleeve 4 is engaged in the deformable bearing 2 and, in clamped position, the mechanism 5 blocks the sleeve 4. The unclamping of the mechanism 5 makes it possible to slide (axis XX) the sleeve 4 in the deformable bearing 2 to adjust the axial position of the steering wheel. The clamping mechanism 5 has in general the double function of clamping the longitudinal adjustment and the angular adjustment, that is to say the adjustment movement of the whole of the steering column 100 pivoting around the pivot of axis YoYo borne by the base of the column at the level of the assistance module, to adjust the angle of the column 100.

The clamping mechanism 5 is formed of a clamping axle 51 passing through the two lugs 32 of the support 3 and the limbs 21 of the deformable bearing 2 to clamp/unclamp at the same time the bearing 2 and block the support 3 by a clamping device 52, not detailed. One end of the clamping axle 51 is integral with a lever 53 manoeuvring the device 52 whereas its other end receives a nut 54 (FIG. 4A) longitudinally blocking the clamping axle 51. The clamping axle 51 has a transversal geometric axis YY, perpendicular to the vertical plane passing through the axis XX.

The clamping device 52 which acts in the transversal direction YY to clamp the deformable bearing 2 by a cam effect controlled by the lever 53 is formed of known spacer members not requiring detailed description.

In unclamped position, the spacing (in the direction YY) of the device 52 is at the least such that the deformable bearing 2 is not clamped, in the same way that the lugs 32 of the support 3, with respect to the guiding surfaces of the outer faces of the laterals of the bearing 2. In clamped position, the spacing of the device 52 increases, which reduces in a corresponding manner the spacing of the limbs 21 of the bearing 2 which are compressed on the sleeve 4:
- the sleeve 4 will thus be compressed in the bearing 2, which blocks the longitudinal adjustment,
- the lugs 32 of the support 3 will be blocked against the external guiding surfaces of the bearing 2, which blocks the angular adjustment.

FIG. 2 is an isometric view of the steering column 100 limited to the body 1 in which is engaged the sleeve 4 and FIG. 3 is an isometric view of the body 1 alone without the sleeve 4.

According to FIG. 2, the body 1 is a casing 11, rigid, of polygonal section, made of bent sheet and welded continuing forwards (AV) by two fork shaped extensions 12 with hinge bearings 121, of geometric axis YoYo for the angular tilting adjustment of the steering column 100; rearwards (AR), it continues by the deformable bearing 2, of same polygonal section as the casing 11. The lower part of the body 1 shrouds by its facets the sleeve 4, as will be detailed hereafter.

The casing 11 is formed of two lateral walls 111 connected by a top 112 forming a part of rectangular section whereas the lower part formed by two inclined facets 113 connected by a bottom 114 has a semi-hexagonal section. The section of the casing 11 closed by the top 112 is a rigid U shaped polygonal section.

The deformable bearing 2 globally has the same cylindrical U shape with polygonal section composed of two lateral limbs 21 continuing downwards by two inclined facets 22 and by a bottom 23 joining the two facets 22. The bearing 2 corresponding to the part of the body 1 with an open top is deformable whereas the casing 11 with closed top is rigid.

FIG. 2 also shows one of the orifices 211 forming a bearing for the passage of the clamping axle 51 of geometric axis YY, in the limb 21, the other orifice being hidden.

The limbs 21 are provided with runners 212 and one of the limbs has a press-formed part 213 to guide the lugs 32 of the support 3, as is known.

The top of the sleeve 4 is provided with a folded plate 43 formed of two flaps 432 on either side of a median band 431.

FIG. 3 shows details of the deformable bearing 2 highlighting both its geometry and the elements forming the interface of the bearing 2 and the sleeve 4 figuring the structure of the shroud of the bearing, that is to say the two lateral limbs 21, the two inclined facets 22 and the bottom 23.

Internally, the upper part of the limbs 21 is equipped with two lying V shaped consoles 6 of which the folded ends 61, 62 are welded to the limb 21. The consoles 6 stiffen the walls 21 in the passage region of the clamping axle 51 and each forms a bearing surface by the lower leg 63 of this V shape whereas the upper leg 64 is provided with a slot 65 for the passage of the clamping axle 51 (not represented here). Each of the two legs 63 is inclined downwards according to an angle of the order of 45° facing the inclined facets 22.

The legs 63 in the same way as the facet 22 and the bottom 23 are equipped with pads 7 coming into contact with the sleeve 4.

The legs 63, the facet 22 and the bottom 23 are pierced with snap locking slots 72 as is shown for the leg 63 of the console 6 on the left of FIG. 3. The pads 7 bear snap locking pins 71 of which the end hooks appear on the inner side of the lower legs 63 and the outer side of the inclined facet 22 on the left side of FIG. 3.

The surfaces, namely the two legs 63, the two facets 22 and the bottom 23 receiving the pads 7 are flat surfaces.

The pads 7 equipping these surfaces 63, 22, 23 are also flat and form five bearing surfaces 7a-7e which globally tangentially shroud the circular section of the sleeve 4 with its plate 43. The pads 7 are preferably small plastic plates.

FIGS. 4A, 4B show the section of the deformable bearing 2 highlighting the distribution of the bearing surfaces 7a-7e formed by the pads 7 on the legs 63 of the consoles 6, the inclined facets 22 and the bottom 23. The bearing surfaces of the pads 7 here bear the particular references 7a, 7b for the legs 63; the references 7c, 7d for the facet 22 and the reference 7e for the bottom 23. The flaps 432 of the folded plate 43 fastened to the sleeve 4 are facing the pads 7 of the two legs 63 such that the flaps 432 are opposite the upper lateral bearing surfaces 7a,b. Thus, the sleeve 4 is rotationally blocked around the axis XX whether the bearing 2 is clamped or unclamped. The length in the direction of the axis XX of the flaps 432 corresponds to the range of axis al adjustment of the steering column 100, that is to say the axial adjustment travel (axis XX) of the sleeve 4 with respect to the deformable bearing 2.

As already indicated, the section of the deformable bearing 2 is symmetrical with respect to the median plane PP which also passes through the axis XX of the sleeve 4 or the position of the sleeve 4 in the bearing 2.

FIG. 4A also shows the clamping axle 51 of which one end is retained against the outer face of the limb 21 by a nut 54 and the other, provided with the lever 53, rests against the outer face of the other limb 21 through the clamping device 52. This device 52 is shown schematically by two ramps sliding one on the other by the rotational movement imparted by the lever 53 to clamp or unclamp the limbs 21 (arrows S and D).

The clamping axle 51 passes through the consoles 6 which, due to their fastening to the limbs 21, stiffen the corresponding part of the limbs 21. The limbs 21 thus transmit the clamping force to the lower part of the U shape of the deformable bearing 2, that is to say to the inclined facets 22 and to the bottom 23.

The support 3 and its lugs 32 applied against the outer face of the limbs 21 under the nut 54 and under the device 52 have not been represented.

The simplified diagrams of FIGS. 5 and 6 make it possible to explain the two states of the steering column 100, the unclamped state for adjustments and the locked state, blocking adjustments. The displacements and deformations of the parts of the deformable bearing 2 concerned by the clamping/unclamping movements are represented in an exaggerated manner in FIGS. 5 and 6 to facilitate the understanding of this alternance between the two states.

According to FIG. 5, in the unclamped state of the deformable bearing 2, the sleeve 4 is held by the upper lateral bearing surfaces 7a, 7b of the two consoles 6 in the upper part and by the intermediate bearing surface 7e of the bottom 23. The geometry of the bearing 2 is such that the lower lateral bearing surfaces 7c, 7d are not applied against the sleeve 4 in this unclamped state.

As already indicated, the sleeve 4 is held by the flaps 431 of its folded plate 43 against the upper lateral bearing surfaces 7a, 7b of the legs 63, which rotationally blocks it with respect to the axis XX; the contact with the three bearing surfaces 7a, 7b, 7e forms an efficient means for guiding the sleeve 4 for its adjustment movement along the axis XX and if need be combined with an angular adjustment along the axis YoYo.

To summarise, in the unclamped state, the deformable bearing 2 constitutes three guiding surfaces for the sleeve 4.

FIG. 5 shows the clamped state of the bearing 2. The clamping axle 51 is shortened by the clamping mechanism 52, the spacing of the clamping device 52 increasing such that the lateral limbs 21 are clamped and very schematically the upper lateral bearing surfaces 7a,b of the consoles 6 push the sleeve 4 downwards such that it comes into contact with the lower lateral bearing surfaces 7e, 7d of the inclined facets 22 which, themselves, are brought closer to the median plane PP by the clamping of the axle 51.

These complex movements and deformations of the lower part of the deformable bearing 2, below the upper part of the limbs 21 stiffened by the consoles 6, move away the bottom 23 such that the sleeve 4 is no longer in contact with the intermediate bearing surface 7e of the bottom 23.

The adjustment of the clamping travel of the lateral limbs 21, imposed by the device 52, is such that the four upper and lower lateral bearing surfaces 7a, 7b, 7c and 7d of the deformable bearing 2 block the sleeve 4.

Thus and to summarise, the upper lateral bearing surfaces 7a, 7b borne by the legs 63 of the consoles 6, close to the clamping axle 51 which passes through the consoles 6, benefit from the rigidity of the structure at this level and have a double function of guiding surface and blocking surface whereas the other bearing surfaces 7c, 7d and 7e only have a guiding function (intermediate bearing surface 7e) or blocking function (lower lateral bearing surfaces 7c and 7d).

It should be noted once again that the movements and deformations of the deformable bearing 2 are of very small amplitude and are represented in a very exaggerated manner in FIGS. 4 and 5. The movements and deformations are induced by the clamping of the axle 52 passing through the part of the bearing 2 stiffened by the consoles 6 and thus these movements are transmitted to the inclined facets 22 and to the bottom 23, in parallel with the downwards displacement imposed on the sleeve 4 by the upper lateral bearing surfaces sliding on the flaps 432 of the panel 43.

The sleeve 4 is considered, at this scale, as incompressible and thus non-deformable compared to the deformable bearing 2. Thus, even very small movements suffice to switch from the unclamped state to the clamped state, the latter being the blocking state.

An alternative embodiment of a steering column 100m according to the invention is represented in FIGS. 7-9. This alternative globally inverses the front/rear (AV/AR) positions of the means for clamping the tilting and sliding adjustments with respect to the sleeve receiving the tube bearing the steering wheel and the body of the steering column.

In order to facilitate and simplify this description, components identical to those of the preceding embodiment bear the same references and analogous or equivalent components bear the same numerical references completed by the suffix "m".

According to FIGS. 7, 7A, 7B, the alternative of steering column 100m is schematically represented without the steering wheel; it is composed of a body 1m in the form of a tubular casing 11m connected to a base plate 115, itself connected to the steering mechanism, not represented. The base plate 115 is connected by a pivot 34 to the front cross-member 35 of a support 3 in the form of a rider. This support 3 is fastened to the bodywork of the vehicle. The body 1m receives the sleeve 4m provided with a tube 41 bearing the steering wheel, not represented.

The body 1m bears by its tubular casing the sleeve 4m in a longitudinally adjustable manner (axis XX) and this body is itself mounted tilting around the geometric axis YoYo with respect to the support 3 around the pivot 34. The sleeve 4m receives the tube 41 translationally integral (axis XX) but rotationally free around this axis XX.

According to FIG. 7A, the tube 41 is held in the sleeve 4m by an anti-friction bearing 46 and by its splined connection 44 to the transmission tube 45, itself held in an anti-friction bearing 47 of the tubular casing 11m close to the fastening thereof in the base plate 115.

In this alternative, the sleeve 4m is fitted by its front side AV end on the tubular body 11m for the longitudinal adjustment of the steering column 100m.

On the rear side (AR), the sleeve 4m is provided with fastening means, not represented, for controls associated with the steering wheel or with the steering column 100m as for the first embodiment described above.

The support 3 in the form of rider fixed to the bodywork has a rear cross-member 31 with two lugs 32 coming on either side of the deformable bearing 2m of the sleeve 4m and cooperating with the clamping mechanism 5.

In this alternative, the deformable bearing 2m is not borne by the body of the steering column 100m but by the sleeve 4m.

The clamping mechanism 5 functions in a manner similar to the first embodiment described above by compressing reciprocally the deformable bearing 2m of the sleeve 4m on the body 1 (tubular casing 11m) instead of clamping the deformable bearing 2 of the casing 11 of the body 1 on the sleeve 4 as in the first embodiment.

For details of the description of this second embodiment, it is indispensable to examine firstly the shape of the sleeve 2m according to FIG. 8 of which the orientation is the same as that of the sleeve in FIGS. 7 and 7A.

According to the isometric view of FIG. 8, the sleeve 4m comprises, on the front side AV, an open part with U section of shape and structure similar to those of the deformable bearing 2 of the first embodiment (FIG. 2) but in top/bottom overturned position so as to receive the clamping axle in its lower part and not in its upper part as in the first embodiment.

The deformable bearing 2m has two limbs 21m having in the upper part, flat or curved inclined facets 22m and a top 23m.

The limbs 21m are provided with two consoles 6m, symmetrical, with folded ends 61m, 62m and a lower leg 63m. The upper legs 64m of the two consoles 6m receive pads, not represented, to form bearing surfaces in an analogous manner to the pads 7 and to the bearing surfaces 7a-e of the first embodiment.

But whereas in the first embodiment the limbs 21 and consoles 6 were traversed by a runner 212 and a slot 65, both of vertical orientation to enable the tilting movement of the deformable bearing 2 (borne by the body 1), in this second embodiment 100m, the deformable bearing 2m which is borne by the sleeve 2m must enable the telescoping sliding of the sleeve 2m with respect to the body 1m, that is to say the tubular casing 11m which is fastened in the axial direction (XX).

To do so, the limbs 21m have a horizontal window 212m in the same way that the consoles 6m have, in their lower leg 63m, a window 65m. These windows do not appear in their totality in the different figures due to the complexity of the structure of the component combining the sleeve 4m and the deformable bearing 2m.

FIG. 9 shows the fitting of the sleeve 4m on the tubular casing 11m. The tube 41 is also put in place.

The front end 111m of the tubular casing 11m comprises two pairs of tongues 112m for retaining the anti-friction bearing 47 (FIG. 7A).

FIG. 9 shows the bearing surface facets 22m, 23m and the legs 21m of the extension of the sleeve forming the top of the deformable bearing 2m as well as the bearing surfaces formed by the consoles 6m.

The clamping axle 51 passes transversally in the window 212m such that it does not hinder translations of the deformable bearing 2m; it can only limit the adjustment travel thereof since the clamping axle 51 borne by the support 3 remains at a fixed distance from the pivot 34 integral with the support 3.

The isometric views of FIGS. 7, 7A, 7B make it possible to see the clamping mechanism 5 identical to that of the first embodiment.

The clamping mechanism 5 is formed of a clamping axle 51 only appearing by its ends, traversing the two lugs 32 of the support 3 and the limbs 21m of the deformable bearing 2m to clamp/unclamp at the same time the bearing 2m on the tubular casing 11m and is blocked on the support 3 by a clamping device, not detailed. One end of the clamping axle 51 is integral with the lever 53 manoeuvring the clamping device, not visible, whereas its other end receives a nut 54 (FIG. 7B) longitudinally blocking the clamping axle 51. The clamping axle 51 has a transversal geometric axis YY, perpendicular to the vertical plane 1 passing through the axis XX.

The clamping device which acts in the transversal direction YY to clamp the deformable bearing 2m by a cam effect controlled by the lever 53 is formed of known spacer members not requiring detailed description.

In unclamped position, the spacing (in the direction YY) of the clamping device is at the least such that the deformable bearing 2m is not clamped, in the same way that the lugs 32 of the support 3 with respect to the guiding surfaces of the outer faces of the limbs 21m from the bearing 2m. In clamped position, the spacing of the clamping device increases, which reduces in a corresponding manner the spacing of the limbs 21m from the bearing 2m which are compressed on the tubular casing 11m:

the tubular casing 11m will thus be compressed in the bearing 2m, which blocks the longitudinal adjustment of the sleeve integral with the deformable bearing 2m, and the lugs 32 of the support 3 will be blocked against the outer guiding surfaces of the bearing 2m, which blocks the angular adjustment.

The details of the clamping/unclamping of the bearing surfaces are analogous to those described by means of FIGS. 5 and 6 of the first embodiment.

| NOMENCLATURE OF THE MAIN ELEMENTS | |
|---|---|
| 100, 100m | Steering column |
| 1, 1m | Body of the steering column |
| 11 | Casing 11m Tubular casing |
| 111 | Lateral wall 111m Front end |
| 112 | Above 112m Tongues |
| 113 | Inclined facet |
| 114 | Below |
| 115 | Baseplate |
| 12 | Fork shaped extension |
| 121 | Bearing |
| 2, 2m | Deformable bearing |
| 21, 21m | Limb |
| 211 | Through opening for the clamping axle |
| 212 | Slide 212m Window |
| 213 | Press-formed part |
| 22, 22m | Inclined facet |
| 23 | Bottom 23m Top |
| 3 | Rider shaped support |
| 31 | Cross-member |
| 32 | Lug |
| 33 | Opening forming bearing |
| 34 | Axle |
| 35 | Front cross-member |
| 4, 4m | Sleeve |
| 41 | Tube bearing the steering wheel |
| 42 | Support |
| 43 | Folded plate |
| 431 | Median band |
| 432 | Flap |
| 44 | Splined connection |
| 45 | Transmission tube |
| 46 | Anti-friction bearing |
| 47 | Anti-friction bearing |
| 48 | Stop |
| 5 | Clamping mechanism |
| 51 | Clamping axle |
| 52 | Clamping device |
| 53 | Lever |
| 54 | Nut |
| 6, 6m | Console |
| 61, 62 | Folded end 61m, 62m Folded end |
| 63, 63m | Lower leg |
| 64, 64m | Upper leg |
| 65 | Slot 65m Window |
| 7 | Pad |
| 7a, b | First lateral bearing surface |
| 7c, d | Second inclined lateral bearing surface |
| 7e | Intermediate bearing surface |
| 71 | Snap locking pin |
| 72 | Snap locking slot |
| D | Direction of unclamping |
| PP | Median plane of the deformable bearing |
| S | Direction of clamping |
| XX | Longitudinal adjustment axis of the steering column |
| YoYo | Tilting axis for adjusting the steering column |
| YY | Geometric axis of the clamping axle |

The invention claimed is:

1. A steering column with adjustment of the longitudinal extension and inclination of the steering wheel comprising:
a support integral with the bodywork,
a body mounted tilting around an axis of the support for the angular adjustment of the steering column,
a sleeve borne by the body and adjustable in longitudinal extension with respect to the body and receiving the tube bearing the steering wheel, the sleeve and the body being connected by a deformable bearing provided with a clamping mechanism composed of a clamping axle associated with the deformable bearing and a clamping mechanism actuated by a lever, the support overlapping the deformable bearing at the level of the clamping mechanism to block or unblock the adjustments of the steering column by manoeuvring the lever, steering column characterised in that the sleeve is a cylinder of circular section, the deformable bearing is U shaped with two lateral limbs connected by a cross-member formed of two inclined facets joined by a bottom, constituting a symmetrical shell and of which:

the two lateral limbs each form a first lateral bearing surface close to the end of the limb, the two inclined facets each form a second inclined lateral bearing surface opposite to the first lateral bearing surfaces, and the bottom forms an intermediate bearing surface between the two inclined lateral bearing surfaces, the bearing surfaces tangentially shroud the circular section of the sleeve, the clamping axle passing through the end of the two lateral limbs beyond the two first lateral bearing surfaces, in unclamped position of the deformable bearing for adjustment, the sleeve is held and guided while sliding in the direction of extension by the cooperation of the intermediate bearing surface and the two first lateral bearing surfaces, in clamped position of the deformable bearing for blocking, the two first lateral bearing surfaces and the two inclined bearing surfaces by moving away the intermediate bearing surface by the clamping deformation of the deformable bearing.

2. The steering column according to claim 1, wherein the steering column further comprises a casing made of bent sheet with U shaped polygonal section, covered by a top stiffening it and connected by a pivot to the support.

3. The steering column according to claim 2, wherein the lateral limbs are each provided with a console with lying V section of which the ends of the legs are welded to the respective limb and of which the inclined lower leg with the upper leg form a bearing surface facing the bearing surface of the inclined facet, opposite.

4. The steering column according to claim 3, wherein the upper and lower lateral bearing surfaces as well as the intermediate bearing surface are formed by plates fastened respectively to the consoles of each wall, to the inclined facets and to the bottom.

5. The steering column according to claim 2, wherein the top of the sleeve, at least in the part of its length cooperating with the deformable bearing, is provided with a folded plate with two flaps connected by a median band, the two flaps being in a position homologous to that of the upper lateral bearing surfaces to receive the bearing surfaces in clamped position and in unclamped position of the deformable bearing.

6. The steering column according to claim 2, wherein the upper and lower lateral bearing surfaces as well as the intermediate bearing surface are formed by plates fastened respectively to the consoles of each wall, to the inclined facets and to the bottom.

7. The steering column according to claim 2, wherein, in the unclamped position of the deformable bearing, the sleeve is held and guided along the axis by the cooperation of the intermediate bearing surface and the two first lateral bearing surfaces against the sleeve.

8. The steering column according to claim 7, wherein, in the clamped position of the deformable bearing, the two first lateral bearing surfaces and the two second bearing surfaces are applied against the sleeve by moving away the intermediate bearing surface from the sleeve by deformation of the deformable bearing.

9. The steering column according to claim 2, wherein, in the clamped position of the deformable bearing, the two first lateral bearing surfaces and the two second bearing surfaces are applied against the sleeve by moving away the intermediate bearing surface from the sleeve by deformation of the deformable bearing.

10. The steering column according to claim 1, wherein the steering column further comprises a tubular casing mounted in a base plate connected by a pivot to the support, wherein the deformable bearing is configured to receive the tubular casing.

11. The steering column according to claim 10, wherein the lateral limbs are each provided with a console with lying V section of which the ends of the legs are welded to the respective limb and of which the inclined lower leg with the upper leg form a bearing surface facing the bearing surface of the inclined facet, opposite.

12. The steering column according to claim 10, wherein, in the unclamped position of the deformable bearing, the tubular casing is held and guided along the axis by the cooperation of the intermediate bearing surface and the two first lateral bearing surfaces against the tubular casing.

13. The steering column according to claim 12, wherein, in the clamped position of the deformable bearing, the two first lateral bearing surfaces and the two second inclined lateral bearing surfaces are applied against the tubular casing by moving away the intermediate bearing surface from the tubular casing by deformation of the deformable bearing.

14. The steering column according to claim 10, wherein, in the clamped position of the deformable bearing, the two first lateral bearing surfaces and the two second inclined lateral bearing surfaces are applied against the tubular casing by moving away the intermediate bearing surface from the tubular casing by deformation of the deformable bearing.

15. The steering column according to claim 1, wherein the clamping axle passes through the limbs in the zone overlapped by the console of each limb and externally resting on the limbs to clamp/unclamp them and to block/unblock the deformable bearing.

\* \* \* \* \*